United States Patent
Nishida (10) Patent No.: US 12,545,902 B2
(45) Date of Patent: Feb. 10, 2026

(54) METHODS FOR RECOVERING AND PRODUCING TARGET PROTEIN

(71) Applicant: Denka Company Limited, Tokyo (JP)

(72) Inventor: Kenichi Nishida, Tokyo (JP)

(73) Assignee: Denka Company Limited

( * ) Notice: Subject to any disclaimer, the term of this patent is extended or adjusted under 35 U.S.C. 154(b) by 464 days.

(21) Appl. No.: 18/007,307

(22) PCT Filed: Aug. 5, 2021

(86) PCT No.: PCT/JP2021/029186
§ 371 (c)(1),
(2) Date: Jan. 30, 2023

(87) PCT Pub. No.: WO2022/030600
PCT Pub. Date: Feb. 10, 2022

(65) Prior Publication Data
US 2023/0265403 A1 Aug. 24, 2023

(30) Foreign Application Priority Data
Aug. 5, 2020 (JP) .................................. 2020-133113

(51) Int. Cl.
*B01D 11/02* (2006.01)
*C07K 1/14* (2006.01)
*C12N 9/16* (2006.01)

(52) U.S. Cl.
CPC ............ *C12N 9/16* (2013.01); *B01D 11/0288* (2013.01); *C07K 1/145* (2013.01)

(58) Field of Classification Search
CPC .... C12N 9/16; B01D 11/0288; B01D 11/028; C07K 1/145; C07K 1/00; C07K 1/14; C07K 1/36
See application file for complete search history.

(56) References Cited

U.S. PATENT DOCUMENTS 6,284,875 B1    9/2001 Turpen et al.
6,617,435 B2 *  9/2003 Turpen ............... C12N 15/8257
                                                530/427
(Continued)

FOREIGN PATENT DOCUMENTS

AU    2003213542 A1    8/2003
AU    2008259821 B2 *  9/2013 ......... B01D 11/0288
(Continued)

OTHER PUBLICATIONS

Dixon et al., "The Impact of Six Critical Impurities on Recombinant Protein Recovery and Purification from Plant Hosts", *Molecular Pharming: Applications, Challenges, and Emerging Areas*, First Edition, pp. 137-180 (2018).
(Continued)

*Primary Examiner* — Joseph W Drodge
(74) *Attorney, Agent, or Firm* — Leydig, Voit & Mayer, Ltd.

(57) ABSTRACT

The present invention discloses a method for recovering a target protein expressed in an apoplast, comprising a step of injecting a buffer into a plant body that expresses the target protein in an apoplast through a stoma, a water pore, or a cross-section of the plant body; and a step of extracting a buffer present inside the plant body through a stoma, a water pore, or a cross-section.

12 Claims, 3 Drawing Sheets

(56) References Cited

U.S. PATENT DOCUMENTS

| | | | |
|---|---|---|---|
| 2003/0073209 A1* | 4/2003 | Turpen | C12Y 302/01045 |
| | | | 530/370 |
| 2008/0045702 A1* | 2/2008 | Lanahan | C12N 9/2422 |
| | | | 536/23.6 |
| 2012/0045818 A1* | 2/2012 | Hwang | C12N 15/8257 |
| | | | 435/209 |
| 2014/0024104 A1* | 1/2014 | Couture | C07K 14/415 |
| | | | 530/370 |
| 2015/0140644 A1 | 5/2015 | McDonald et al. | |

FOREIGN PATENT DOCUMENTS

| | | |
|---|---|---|
| CN | 110483616 A | 11/2019 |
| JP | P2002-522559 A | 7/2002 |
| JP | 2015-154769 A | 8/2015 |
| WO | WO 00/09725 A2 | 2/2000 |
| WO | WO 2012-012462 A2 | 1/2012 |

OTHER PUBLICATIONS

Marillonnet et al., "In planta engineering of viral RNA replicons: Efficient assembly by recombination of DNA modules delivered by Agrobacterium", *PNAS*, vol. 101(18): pp. 6852-6857 (May 4, 2004).

Mimura, Tetsuro, "Water and Inorganic Ions in Apoplast", *Chemistry and Biology*, vol. 35(9): pp. 643-648 (1997).

Japan Patent Office, International Search Report issued in International Application No. PCT/JP2021/029186 (Sep. 14, 2021).

The International Bureau of WIPO, International Preliminary Report on Patentability issued in International Application No. PCT/JP2021/029186 (Feb. 16, 2023).

Kingsbury Nathaniel J. et al, "Quantitative Evaluation of E1 Endoglucanase Recovery from Tobacco Leaves Using the Vacuum Infiltration-Centrifugation Method", *Biomed Research International*, vol. 2014, p. 1-p. 10 (May 26, 2014).

Gentzel Irene et al, "A Simple Method for Measuring Apoplast Hydration and Collecting Apoplast Contents", *Plant Physiology*, vol. 179, No. 4, p. 1265-p. 1272 (Mar. 1, 2019).

\* cited by examiner

METHODS FOR RECOVERING AND PRODUCING TARGET PROTEIN

CROSS-REFERENCE TO RELATED APPLICATIONS

This patent application is the U.S. national phase of International Application No. PCT/JP2021/029186, filed on Aug. 5, 2021, which claims the benefit of Japanese Patent Application No. 2020-133113, filed Aug. 5, 2020, the disclosures of which are incorporated herein by reference in their entireties for all purposes.

TECHNICAL FIELD

The present invention relates to methods for recovering and producing a target protein.

BACKGROUND ART

A method in which a target protein is expressed in a plant body by a genetic engineering technology to recover the expressed target protein has been developed. In the conventional recovery and production of a target protein using a plant body, a method in which most of plant components are extracted by grinding a plant leaf is employed in many cases as described in, for example, Non Patent Literature 1.

In the conventional method employing the grinding of a plant body, however, an extract obtained by grinding the plant body contains, in addition to a target protein, a plant-derived insoluble foreign matter such as a plant residue, and an insoluble impurity, and it is necessary to perform a purification process for removing these. As described in Non Patent Literature 2, when the amount of an extract of the target protein is to be increased, the amount of unwanted plant components increases, which increases load in the purification process.

CITATION LIST

Non Patent Literature

Non Patent Literature 1: Marillonnet et al., "In planta engineering of viral RNA replicons: efficient assembly by recombination of DNA modules delivered by *Agrobacterium*", Proc Natl Acad Sci USA., 2004 Oct. 26; 101 (43): 15546

Non Patent Literature 2: Dixon et al, "The impact of Six Critical Impurities on Recombinant Protein Recovery and Purification from Plant Hosts", Molecular Pharming: Applications, Challenges, and Emerging Areas, 2018, 137-180

SUMMARY OF INVENTION

Technical Problem

An object of the present invention is to provide a method for recovering a target protein and a method for producing a target protein without requiring grinding of a plant body.

Solution to Problem

The present inventors have found that when a buffer is injected into a plant body that expresses a target protein in an apoplast through a stoma, a water pore, or a cross-section of the plant body, and a buffer present inside the plant body is extracted through a stoma, a water pore, or a cross-section, the target protein expressed in an apoplast can be recovered without grinding the plant body. The present invention is accomplished based on this novel finding.

Specifically, the present invention relates to, for example, the following inventions:

[1]
A method for recovering a target protein expressed in an apoplast, comprising: a step of injecting a buffer into a plant body that expresses the target protein in an apoplast through a stoma, a water pore, or a cross-section of the plant body; and a step of extracting a buffer present inside the plant body through a stoma, a water pore, or a cross-section.

[2]
The method according to [1], wherein the step of injecting a buffer into a plant body through a stoma, a water pore, or a cross-section includes injecting the buffer by pressurization or depressurization.

[3]
The method according to [1] or [2], wherein the step of extracting a buffer present inside the plant body through a stoma, a water pore, or a cross-section includes extracting the buffer by pressurization or depressurization.

[4]
The method according to [1], wherein the step of injecting a buffer into a plant body through a stoma, a water pore, or a cross-section includes injecting the buffer by pressurization or depressurization, the step of extracting a buffer present inside the plant body through a stoma, a water pore, or a cross-section includes extracting the buffer by pressurization or depressurization, and assuming that a combination of the step of injecting a buffer into a plant body through a stoma, a water pore, or a cross-section and the step of extracting a buffer present inside the plant body through a stoma, a water pore, or a cross-section is defined as 1 set, the method includes repeatedly performing 2 or more sets of the steps.

[5]
The method according to any one of [1] to [4], wherein the step of extracting a buffer present inside the plant body through a stoma, a water pore, or a cross-section includes immersing the plant body in a buffer having higher osmotic pressure than the buffer having been injected into the plant body through a stoma, a water pore, or a cross-section.

[6]
The method according to any one of [1] to [5], wherein the step of extracting a buffer present inside the plant body through a stoma, a water pore, or a cross-section includes immersing the plant body in a buffer having a higher salt concentration than the buffer having been injected into the plant body through a stoma, a water pore, or a cross-section.

[7]
The method according to [2] or [4], wherein the injecting the buffer into the plant body by pressurization or depressurization includes increasing or reducing the pressure in a pressure vessel using a gas, a liquid, a press, or a combination thereof.

[8]
The method according to [3] or [4], wherein the extracting the buffer present inside the plant body by pressurization or depressurization includes increasing or reducing the pressure in a pressure vessel using a gas, a liquid, a press, or a combination thereof.

[9]
A method for producing a target protein, comprising: a step of providing a plant body that expresses the target protein in an apoplast; a step of injecting a buffer into the plant body through a stoma, a water pore, or a cross-section of the plant body; and a step of extracting a buffer present inside the plant body through a stoma, a water pore, or a cross-section.

[10]

The method according to [9], wherein the step of injecting a buffer into the plant body through a stoma, a water pore, or a cross-section includes injecting the buffer by pressurization or depressurization.

[11]

The method according to [9] or [10], wherein the step of extracting a buffer present inside the plant body through a stoma, a water pore, or a cross-section includes extracting the buffer by pressurization or depressurization.

[12]

The method according to claim [9], wherein the step of injecting a buffer into the plant body through a stoma, a water pore, or a cross-section includes injecting the buffer by pressurization or depressurization, the step of extracting a buffer present inside the plant body through a stoma, a water pore, or a cross-section includes extracting the buffer by pressurization or depressurization, and assuming that a combination of the step of injecting a buffer into the plant body through a stoma, a water pore, or a cross-section and the step of extracting a buffer present inside the plant body through a stoma, a water pore, or a cross-section is defined as 1 set, the method includes repeatedly performing 2 or more sets of the steps.

[13]

The method according to any one of [9] to [12], wherein the step of extracting a buffer present inside the plant body through a stoma, a water pore, or a cross-section includes immersing the plant body in a buffer having higher osmotic pressure than the buffer having been injected into the plant body through a stoma, a water pore, or a cross-section.

[14]

The method according to any one of [9] to [13], wherein the step of extracting a buffer present inside the plant body through a stoma, a water pore, or a cross-section includes immersing the plant body in a buffer having a higher salt concentration than the buffer having been injected into the plant body through a stoma, a water pore, or a cross-section.

[15]

The method according to [10] or [12], wherein the injecting the buffer into the plant body by pressurization or depressurization includes increasing or reducing the pressure in a pressure vessel using a gas, a liquid, a press, or a combination thereof.

[16]

The method according to [11] or [12], wherein the extracting the buffer present inside the plant body by pressurization or depressurization includes increasing or reducing the pressure in a pressure vessel using a gas, a liquid, a press, or a combination thereof.

[17]

A method for recovering a target protein expressed in an apoplast, comprising: a step of injecting a buffer into a leaf of a plant body that expresses the target protein in an apoplast through a stoma, or a water pore of the leaf; and a step of extracting a buffer present inside the leaf through a stoma, or a water pore.

[18]

The method according to [17], wherein the step of injecting a buffer into a leaf through a stoma, or a water pore includes injecting the buffer by pressurization or depressurization.

[19]

The method according to [17] or [18], wherein the step of extracting a buffer present inside the leaf through a stoma, or a water pore includes extracting the buffer by pressurization or depressurization.

[20]

The method according to [17], wherein the step of injecting a buffer into a leaf through a stoma, or a water pore includes injecting the buffer by pressurization or depressurization, the step of extracting a buffer present inside the leaf through a stoma, or a water pore includes extracting the buffer by pressurization or depressurization, and assuming that a combination of the step of injecting a buffer into a leaf through a stoma, or a water pore and the step of extracting a buffer present inside the leaf through a stoma, or a water pore is defined as 1 set, the method includes repeatedly performing 2 or more sets of the steps.

[21]

The method according to any one of [17] to [20], wherein the step of extracting a buffer present inside the leaf through a stoma, or a water pore includes immersing the leaf of the plant body in a buffer having higher osmotic pressure than the buffer having been injected into the leaf through a stoma, or a water pore.

[22]

The method according to any one of [17] to [21], wherein the step of extracting a buffer present inside the leaf through a stoma, or a water pore includes immersing the leaf of the plant body in a buffer having a higher salt concentration than the buffer having been injected into the leaf through a stoma, or a water pore.

[23]

The method according to any one of [7] to [22], wherein the target protein is an enzyme.

[24]

The method according to [18] or [20], wherein the injecting the buffer into the plant body by pressurization or depressurization includes increasing or reducing the pressure in a pressure vessel using a gas, a liquid, a press, or a combination thereof.

[25]

The method according to [19] or [20], wherein the extracting a buffer present inside the plant body by pressurization or depressurization includes increasing or reducing the pressure in a pressure vessel using a gas, a liquid, a press, or a combination thereof.

[26]

A method for producing a target protein, comprising: a step of providing a plant body that expresses the target protein in an apoplast; a step of injecting a buffer into a leaf of the plant body through a stoma, or a water pore of the leaf; and a step of extracting a buffer present inside the leaf through a stoma, or a water pore.

[27]

The method according to [26], wherein the step of injecting a buffer into a leaf through a stoma, or a water pore includes injecting the buffer by pressurization or depressurization.

[28]

The method according to [26] or [27], wherein the step of extracting a buffer present inside the leaf through a stoma, or a water pore includes extracting the buffer by pressurization or depressurization.

[29]

The method according to [26], wherein the step of injecting a buffer into a leaf through a stoma, or a water pore includes injecting the buffer by pressurization or depressurization, the step of extracting a buffer present inside the leaf through a stoma, or a water pore includes extracting the buffer by pressurization or depressurization, and assuming that a combination of the step of injecting a buffer into a leaf through a stoma, or a water pore and the step of extracting a buffer present inside the leaf through a stoma, or a water pore is defined as 1 set, the method includes repeatedly performing 2 or more sets of the steps.

[30]

The method according to [26] or [27], wherein the step of extracting a buffer present inside the leaf through a stoma, or a water pore includes immersing the leaf of the plant body in a buffer having higher osmotic pressure than the buffer having been injected into the leaf through a stoma, or a water pore.

[31]

The method according to [24], wherein the step of extracting a buffer present inside the leaf through a stoma, or a water pore includes immersing the leaf of the plant body in a buffer having a higher salt concentration than the buffer having been injected into the leaf through a stoma, or a water pore.

[32]

The method according to any one of [26] to [31], wherein the target protein is an enzyme.

[33]

The method according to [27] or [29], wherein the injecting the buffer into the plant body by pressurization or depressurization includes increasing or reducing the pressure in a pressure vessel using a gas, a liquid, a press, or a combination thereof.

[34]

The method according to [28] or [29], wherein the extracting a buffer present inside the plant body by pressurization or depressurization includes increasing or reducing the pressure in a pressure vessel using a gas, a liquid, a press, or a combination thereof.

Advantageous Effects of Invention

The present invention can provide a method for recovering a target protein and a method for producing a target protein without requiring grinding of a plant body.

When the amount of plant body-derived unwanted components extracted in extracting a target protein is reduced, a load in a purification process is reduced. According to the present invention, since there is no need to grind a plant body, the purification process for removing unwanted plant components contained in an extract obtained by grinding a plant body can be omitted. According to the present invention, with the amount of unwanted plant components reduced, a target protein can be obtained in an amount equivalent to or larger than that obtained by a conventional extraction method including grinding a plant body, and therefore, the target protein can be efficiently extracted and recovered.

BRIEF DESCRIPTION OF DRAWINGS

FIG. 3 is a schematic diagram illustrating pressurization or depressurization performed in a pressure vessel using a gas, a liquid or a press. In a pressure vessel holding a plant immersed in a buffer therein, a pressure can be increased by adding a gas in a direction of a downward arrow, and a pressure can be reduced by evacuating a gas in a direction of an upward arrow (a). In a pressure vessel holding a plant immersed in a buffer therein, a pressure can be increased by adding a liquid in a direction of a downward arrow, and pressure can be reduced by drawing a liquid in a direction of an upward arrow (b). In a pressure vessel holding a plant immersed in a buffer therein, when pressing is performed in a direction of a downward arrow to reduce an enclosed space containing the plant immersed in the buffer, a pressure can be increased by compressing a gas and/or a liquid, and on the contrary, when the enclosed space is expanded in a direction of an upward arrow or a pressure reducing valve is used, a pressure can be reduced (c).

DESCRIPTION OF EMBODIMENTS

Method for Recovering Target Protein

A method for recovering a target protein according to one embodiment of the present invention comprises a step of injecting a buffer into a plant body that expresses a target protein in an apoplast through a stoma, a water pore, or a cross-section of the plant body; and a step of extracting a buffer present inside the plant body through a stoma, a water pore, or a cross-section. Here, the target protein to be recovered is the target protein expressed in the apoplast.

The term "apoplast" used herein means a portion of a plant tissue present outside a cell membrane, namely, the whole of a cell wall and an intercellular space.

The target protein is not limited as long as it can be expressed in an apoplast of a plant body, and may be, for example, a protein that exists in nature, a protein derived from a protein that exists in nature, or an artificially designed protein. Examples of the target protein include an enzyme, an antibody, an antigen, an epitope, a growth factor, a hormone, a cytokine, a transcription factor, a receptor, or a partial peptide of any of these. For example, the target protein may be selected from the group consisting of an enzyme, an antigen, and an antibody, or may be an enzyme. The source of the target protein is not also limited, and it may be derived from, for example, an animal (including a mammal such as a human), a plant, a filamentous fungus, a bacterium, or a yeast.

Examples of the enzyme include an oxidase, a reductase, a lipase (such as a phospholipase), a protease, a kinase, a phosphatase, a cellulase, a steroidogenic enzyme, a methylase, a demethylase, a collagenase, a transglutaminase, a glucosidase, and a chitinase. The enzyme may be, for example, one selected from the group consisting of a phospholipase, an esterase, and an oxidase, may be an esterase, or may be a phosphodiesterase.

Examples of the antibody include a complete antibody, an Fab, an F(ab'), an F(ab')2, an Fc, an Fc-fusion protein, a heavy chain (H chain), a light chain (L chain), a single chain Fv (scFv), an sc(Fv)2, a disulfide-bonded Fv (sdFv), and a diabody.

Examples of the antigen and the epitope include a filamentous fungus-derived protein, a bacteria-derived protein, and a virus-derived protein. When it is an antigen protein or epitope used as a vaccine, it is not especially limited as long as it has immunogenicity, and examples include a protein derived from a pathogenic filamentous fungus, a protein derived from a pathogenic bacterium, and a protein derived from a pathogenic virus.

Examples of the growth factor include an epidermal growth factor (EGF), an insulin-like growth factor (IGF), a transforming growth factor (TGF), a fibroblast growth factor (FGF), a nerve growth factor (NGF), a brain-derived neurotrophic factor (BDNF), a vascular endothelial cell growth factor (VEGF), a granulocyte colony-stimulating factor (G-CSF), a granulocyte macrophage colony stimulating factor (GM-CSF), a platelet-derived growth factor (PDGF), an erythropoietin (EPO), a thrombopoietin (TPO), and a hepatocyte growth factor (HGF).

An example of the hormone includes a peptide/protein-based hormone.

Examples of the cytokine include an interleukin (IL), hematopoietic factors (CSF, EPO, and TPO), interferons (IFNα, IFNβ, and IFNγ), a tumor necrosis factor (TNF), growth factors (EGF, FGF, and PDGF), and a chemokine (IL-8).

Examples of the transcription factor include a basic transcription factor, an upstream transcription factor, and an inducible transcription factor.

Examples of the receptor include a G protein coupled receptor, an ion channel receptor, and a cytokine receptor superfamily.

Alternatively, the target protein may be a fusion protein containing two or more proteins bound to one another. The fusion protein of two or more proteins may be a fusion protein of two or more different proteins, or a fusion protein of two or more of the same proteins.

A molecular weight of the target protein is not especially limited, and may be, for example, 1 kDa to 100 kDa, 1 kDa to 75 kDa, 1 kDa to 50 kDa, or 1 kDa to 10 kDa. The molecular weight of the target protein may be, for example, 500 kDa or less, 300 kDa or less, 200 kDa or less, 100 kDa or less, 75 kDa or less, or 50 kDa or less.

The target protein may be a monomer, a dimer, a trimer, or a multimer.

The target protein may be tagged for making the target protein to be easily detected and/or purified.

A plant body for expressing the target protein can be produced by a known method. Examples of such a method include an agroinfiltration method, a plant virus vector method, a magnICON® system, and a particle gun method.

When the agroinfiltration method is employed, *Agrobacterium* is transformed with T-DNA in which a gene encoding the target protein is inserted, and a plant body is infected with the resultant *Agrobacterium* to obtain a plant body expressing the target protein.

When the plant virus vector method is employed, a plant body is inoculated and infected using, as a vector, an RNA obtained from a cDNA of a plant virus genome in which a gene encoding the target protein is inserted, and thus, a plant body expressing the target protein can be obtained. Examples of such a virus vector include a tobacco mosaic virus (TMV) vector, a plum pox virus (PPV) vector, a potato X virus (PVX) vector, an alfalfa mosaic virus (AIMV) vector, a cucumber mosaic virus (CMV) vector, a cowpea mosaic virus (CPMV) vector, and a zucchini yellow mosaic virus (ZYMV) vector.

When the magntCON® system is used, a cDNA of TMV or PVX genome in which a gene encoding the target protein is inserted is introduced into a T-DNA vector, and a plant body is infected with *Agrobacterium* transformed with the resultant T-DNA vector, and thus, a plant body expressing the target protein can be obtained.

When the particle gun method is employed, a metal fine particle coated with a nucleic acid encoding the target protein is ejected at a high speed to introduce a gene encoding the target protein into a cell, and thus, a plant body expressing the target protein can be obtained.

The plant body used in transformation is not especially limited, and examples include plants belonging to the genus Solanaceae (such as tobacco, an eggplant, a tomato, a green pepper, and a pepper), the genus Rosaceae (such as a rose, and a strawberry), the genus Brassicaceae (such as *Arabidopsis thaliana*, a colza, a Chinese cabbage, a cabbage, a Japanese radish, and a rapeseed), the genus Asteraceae (such as a chrysanthemum, a crown daisy, and a lettuce plant), the genus (Chenopodiaceae (such as a spinach, and a sugar beet), the genus Gramineae (such as wheat, rice, barley, and corn), and the genus Fabaceae (such as a soy bean, an azuki bean, a green bean, and a fava bean). The plant body may be, for example, a plant belonging to the genus Solanaceae or Brassicaceae, may be a plant belonging to *Nicotiana* or *Arabidopsis*, or may be *Nicotiana benthamian*, *Nicotiana tabacum*, or *Arabidopsis thaliana*.

The target protein can be expressed in an apoplast by a known method. For example, a target protein that naturally expresses in an apoplast when expressed in a plant body may be used, or a target protein having been targeted to express in an apoplast (a cell wall and/or an intercellular space) may be used. Examples of the protein expressed in an apoplast include an albumin, an antibody and an antigen. As a method for expressing, in an apoplast, a target protein that is usually expressed in a portion excluding an apoplast, for example, a DNA sequence encoding a signal peptide for directing extracellular localization is linked to a DNA sequence encoding the target protein. Examples of the signal peptide for directing extracellular localization include rice-amylase signal peptide (McCormick, 1999, Proc Natl Acad Sci USA, 96: 703-708), and a secretion targeting signal derived from tobacco plant pathogenesis-related protein (PRP) or calreticulin protein.

Step of Injecting Buffer into Plant Body Expressing Target Protein in Apoplast through Stoma, Water Pore or Cross-section of the Plant Body When a buffer is injected into a plant body through a stoma, a water pore or a cross-section present in the plant body, the buffer is injected into an apoplast inside the plant body. A stoma or a water pore is present usually on an underside of a plant leaf. Alternatively, when the buffer is injected into the plant body through a cross-section formed by cutting the plant body, the buffer is injected into an apoplast inside the plant body. When the buffer is injected into the apoplast, the target protein expressed in the apoplast is transferred to the injected buffer.

As the plant body, for example, a leaf, a root, a shoot, a stem, a flower, a fruit, a germ, a seedling, and a combination of any of these can be used, and when the buffer is injected through a stoma or a water pore, the plant body preferably includes a leaf, and when the buffer is injected through a cross-section, the plant body preferably has a cross-section. Here, since the invention of the present embodiment does not include grinding a plant body expressing the target protein, a part of the form of the plant body is kept after cutting. The cutting of the plant body may be cutting of the plant body in one to three positions, or may be cutting the plant body or a leaf thereof into ⅒ to ½ (in volume), or the plant body may be a cut fragment. The plant body can be cut with, for example, a cutter or a razor.

As the plant body, a raw plant body (such as a fresh leaf) may be used, or a plant body having been subjected to a treatment of freezing, melting, drying or the like may be used as long as the present invention can be practiced thereon.

Examples of a method for injecting a buffer into a plant body through a stoma, a water pore, or a cross-section include a method in which the buffer is directly injected into the plant body through a stoma, a water pore, or a cross-section, a method in which the injection is performed by pressurization or depressurization, and a method in which the injection is performed using osmotic pressure. From the viewpoint of improving extraction efficiency of the target protein, the method for injecting a buffer into the plant body through a stoma, a water pore, or a cross-section is preferably the method in which the injection is performed by pressurization or depressurization. The method for injecting a buffer into the plant body through a stoma, a water pore, or a cross-section may be a method in which the buffer is injected into a leaf through a stoma or a water pore present on the underside of the leaf, and from the viewpoint of improving the extraction efficiency of the target protein, is preferably a method in which the buffer is directly injected into a leaf through a stoma or a water pore, or a method in which the injection is performed by pressurization or depressurization.

An example of the method for directly injecting the buffer into the plant body through a stoma, a water pore, or a cross-section includes a method in which a tip of a syringe holding the buffer therein is applied to a stoma, a water pore, or a cross-section to inject the buffer into the plant body through the stoma, the water pore, or the cross-section by moving a plunger toward the tip of the syringe. At this point, the plunger may be manually moved, or may be moved by applying another mechanical external force.

An example of the method in which the injection is performed by pressurization includes a method in which the buffer is injected into the plant body through a stoma, a water pore, or a cross-section by increasing a pressure in a container holding the plant body immersed in the buffer therein. The pressurization in the container (such as a pressure vessel) can be performed, for example, by injecting a gas into the container, or can be performed by compressing a gas within the container. When the container is a syringe, it can be performed, for example, with one side of the syringe sealed, by moving a plunger (that is in a sealed state inside) from the other side toward the tip of the syringe, or by injecting a gas from the other side. Pressurization in the container is not especially limited as long as it is higher than atmospheric pressure and the buffer can be injected into the plant body through a stoma, a water pore, or a cross-section, and may be, for example, 0.01 to 5 MPa, 0.01 to 1 MPa, 0.01 to 0.5 MPa, or 0.01 to 0.1 MPa. Pressurization time is not especially limited, and may be, for example, 0 to 5 minutes, 0 to 1 minutes, 0 to 0.5 minutes, 1 second to 5 minutes, 1 second to 1 minute, or 1 second to 0.5 minutes.

An example of the method in which the injection is performed by depressurization includes a method in which the buffer is injected into the plant body through a stoma, a water pore, or a cross-section by reducing a pressure in a container (such as a pressure vessel, or a desiccator) holding the plant body immersed in the buffer therein, and then restoring the pressure. The depressurization in the container can be performed, for example, by evacuating the air from the container, and the pressure can be restored by stopping the depressurization and returning the air into the container. When the container is a syringe, it can be performed, for example, with one side of the syringe sealed, by moving a plunger from the other side in a direction opposite to the tip of the syringe, or by evacuating the air within the plunger from the other side. Depressurization in the container is not especially limited as long as it is lower than atmospheric pressure and the buffer can be injected into the plant body through a stoma, a water pore, or a cross-section by restoring the pressure, and may be, for example, −0.01 to −0.1 MPa or −0.01 to −0.05 MPa. Depressurization time is not especially limited, and may be, for example, 0 to 5 minutes, 0 to 1 minutes, 0 to 0.5 minutes, 1 second to 5 minutes, 1 second to 1 minute, or 1 second to 0.5 minutes. A pressure restoring time is also not especially limited, and may be, for example, 0 to 5 minutes, 0 to 1 minute, 0 to 0.5 minutes, 1 second to 5 minutes, 1 second to 1 minute, or 1 second to 0.5 minutes.

Figure 3:
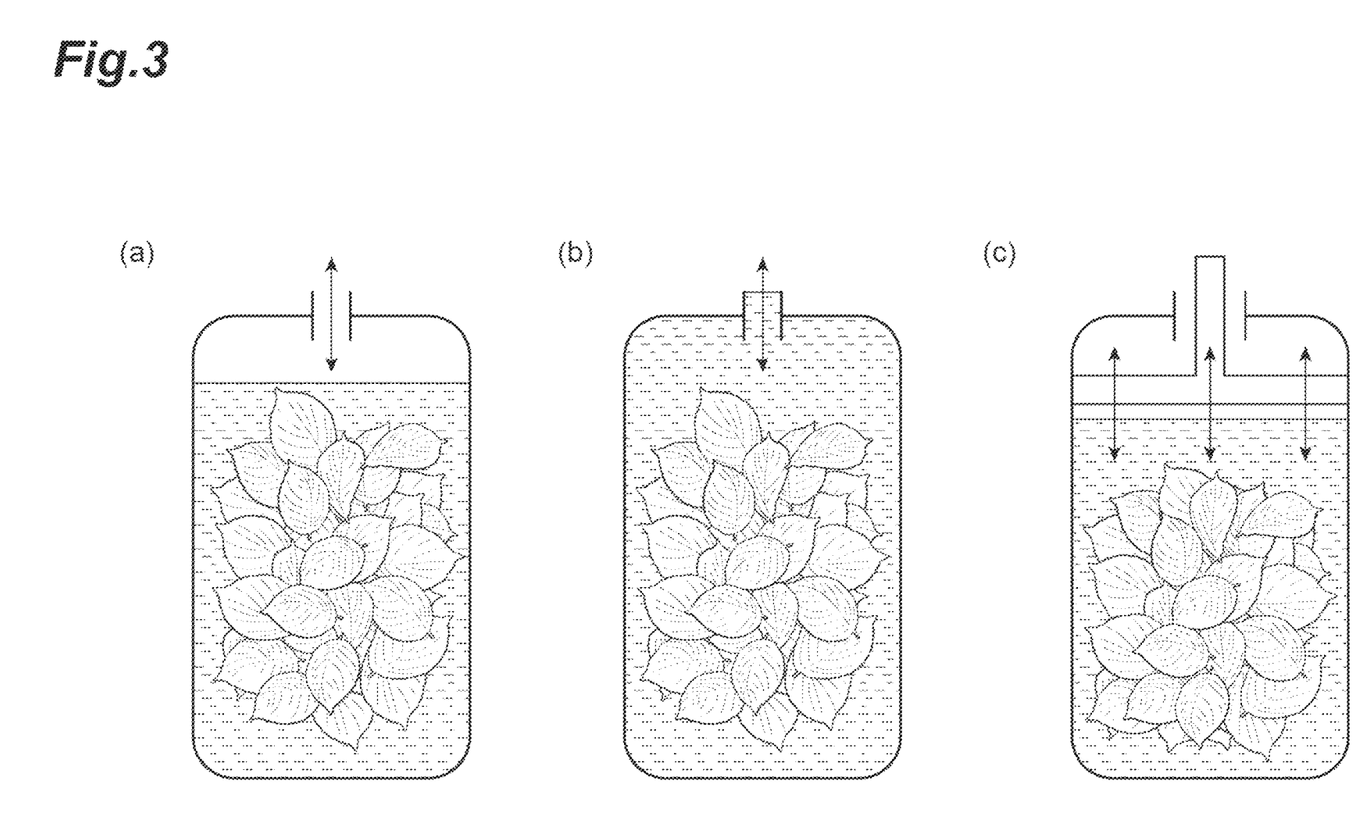

The injecting the buffer into the plant body by pressurization or depressurization may include increasing or reducing the pressure in a pressure vessel (such as a pressure tank) using a gas, a liquid, a press, or a combination of any of these. When a gas pressure is used, for example, the pressure can be increased by adding a gas to a pressure vessel holding a plant immersed in the buffer therein, and the pressure can be reduced by evacuating the gas (FIG. 3(a)). When a liquid is used, for example, the pressure can be increased by adding a liquid to a pressure vessel holding a plant immersed in the buffer therein, and the pressure can be reduced by drawing the liquid (FIG. 3(b)). When a press is used, for example, an enclosed space containing a plant immersed in the buffer in a pressure vessel holding the plant immersed in the buffer therein is narrowed with the press, and thus, the pressure can be increased by compressing a gas and/or a liquid, and on the contrary, the pressure can be reduced by expanding the enclosed space, or using a pressure reducing valve (FIG. 3(c)).

As the method in which the injection is performed using osmotic pressure, for example, a plant body is immersed in a buffer having osmotic pressure lower than a concentration of a liquid contained in an apoplast inside the plant body. For example, a plant body is immersed in a buffer having concentration lower than a concentration of a liquid contained in an apoplast inside the plant body. The concentration of the buffer may be a salt concentration or a sugar concentration.

As the buffer, general buffers such as Tris buffers, phosphate buffers, and citric acid buffers can be used. In the present invention, the buffer is not especially limited, and can be appropriately set by those skilled in the art in consideration of influences on respective protein properties such as a hydration property, stability, and activity that can be caused in the target protein. The concentration of a Tris buffer may be, for example, 10 to 300 mM, and may be 10 to 100 mM. The concentration of a phosphate buffer may be, for example, 10 to 200 mM. The concentration of a citric acid buffer may be, for example, 10 to 200 mM. The pH of the buffer may be, for example, pH 3 to 11, pH 5 to 9, or pH 7 to 9.

The buffer may contain a salt. As the salt contained in the buffer, general salts such as sodium chloride, magnesium chloride, and sodium phosphate can be used. The type and the concentration of an inorganic salt can be appropriately set by those skilled in the art in consideration of influences on respective protein properties such as a hydration property, stability, and activity that can be caused in the target protein. A salt concentration in the buffer may be, for example, 1 to 3000 mM or 1 to 1000 mM. When the buffer is injected into a plant body through a stoma, a water pore, or a cross-section using osmotic pressure, the salt concentration in the buffer where the plant body is immersed is preferably a salt concentration lower than a salt concentration in a liquid contained in an apoplast inside the plant body.

The buffer may contain a sugar. As the sugar contained in the buffer, general sugars such as sucrose, trehalose, and maltose can be used. The type and the concentration of a sugar can be appropriately set by those skilled in the art in consideration of influences on respective protein properties such as a hydration property, stability, and activity that can be caused in the target protein. The sugar concentration in the buffer may be, for example, 0.1 to 50%, or 0.1 to 10%. When the buffer is injected into the plant body through a stoma, a water pore, or a cross-section using osmotic pressure, the sugar concentration in the buffer where the plant body is immersed is preferably a sugar concentration lower than a sugar concentration in a liquid contained in an apoplast inside the plant body.

The buffer may contain an additive. Examples of the additive include a chelating agent such as EDTA, EGTA, NTA, or DTPA, an antioxidant such as α-mercaptoethanol, ascorbate, sodium metabisulfite, or dithiothreitol, a surfactant such as SDS, CTAB, CHAPS, or Triton X-100, a modifier such as urea or guanidine chloride, an amino acid such as aspartic acid or glutamic acid, an alcohol such as glycerol or isopropanol, an enzymatic protein such as cellulase, protease, or pectinase, and a non-enzymatic protein such as expansin.

The buffer may not contain an additive. When an additive such as a chelating agent is added, a process for removing the additive with a column or the like may need to be performed after extracting the buffer through a stoma, a water pore, or a cross-section in some cases. Since the target protein can be extracted with a buffer not containing an additive, the present invention is advantageous in that there is no need to perform the process for removing an additive.

A temperature at which this step is performed is not especially limited, and may be, for example, 1 to 50° C., 1 to 30° C., 1 to 15° C., or 4 to 50° C. For purposes of preventing denaturation of the target protein, the temperature is preferably 30° C. or less.

It is noted that the buffer used in this step may be referred to as a first buffer, and that a buffer used in the "step of extracting a buffer present inside the plant body through a stoma, a water pore, or a cross-section" described below may be referred to as a second buffer. The first buffer and the second buffer may be the same or different. The second buffer may be obtained by adding a salt or the like to the first buffer.

When the buffer is injected into a plant body through a stoma, a water pore, or a cross-section with the plant body immersed in the buffer, the "step of extracting a buffer present inside the plant body through a stoma, a water pore, or a cross-section" described below may be performed with the plant body kept immersed in the buffer, or the "step of extracting a buffer present inside the plant body through a stoma, a water pore, or a cross-section" described below may be performed after separating the plant body from the buffer.

This step may further include, for example, taking out the plant body from the container, removing the buffer adhering to a surface of the plant body, and the like after injecting the buffer into the plant body.

Step of Extracting Buffer Present Inside Plant Body Through Stoma, Water Pore, or Cross-Section The buffer having been injected into the plant body through a stoma, a water pore, or a cross-section contains the target protein expressed in an apoplast. Accordingly, when a buffer present inside the plant body is extracted through a stoma, a water pore, or a cross-section, the target protein can be recovered in a state where it is contained in the buffer.

Examples of a method for extracting a buffer present inside the plant body through a stoma, a water pore, or a cross-section include a method in which the buffer is directly extracted through a stoma, a water pore, or a cross-section, a method in which the extraction is performed by pressurization or depressurization, a method in which the extraction is performed using osmotic pressure, and a method in which the extraction is performed using a centrifugal force. From the viewpoint of improving the extraction efficiency of the target protein, the method for extracting a buffer present inside the plant body through a stoma, a water pore, or a cross-section is preferably a method in which the extraction is performed by pressurization or depressurization, or a method in which the extraction is performed using osmotic pressure. The method for extracting a buffer present inside the plant body through a stoma, a water pore, or a cross-section may be a method in which the buffer present inside a leaf is extracted through a stoma or a water pore, and from the viewpoint of improving the extraction efficiency of the target protein, is preferably a method in which the extraction is performed by pressurization or depressurization, or a method in which the extraction is performed using osmotic pressure. The step of extracting a buffer present inside the plant body through a stoma, a water pore, or a cross-section may exclude performing extraction using a centrifugal force.

An example of the method in which the buffer is directly extracted through a stoma, a water pore, or a cross-section includes a method in which with a tip of an empty syringe applied to a stoma, a water pore, or a cross-section of the plant body, the buffer present inside the plant body is extracted through a stoma, a water pore, or a cross-section by moving a plunger in a direction opposite to the tip of the syringe. At this point, the plunger may be manually moved, or moved by applying another mechanical external force.

An example of the method in which the extraction is performed by pressurization includes a method in which the buffer present inside the plant body is extracted through a stoma, a water pore, or a cross-section by increasing a pressure in a container holding the plant body into which the buffer has been injected therein. The pressurization in the container can be performed, for example, by injecting a gas into the container, or can be performed by compressing a gas within the container. When the container is a syringe, it can be performed, for example, with one side of the syringe sealed, by moving a plunger from the other side toward the tip of the syringe, or by injecting a gas from the other side. Pressurization in the container is not especially limited as long as it is higher than atmospheric pressure and the buffer present inside the plant body can be extracted through a stoma, a water pore, or a cross-section, and may be, for example, 0.01 to 5 MPa, 0.01 to 1 MPa, 0.01 to 0.5 MPa, or 0.01 to 0.1 MPa. Pressurization time is not especially limited, and may be, for example, 0 to 5 minutes, 0 to 1 minutes, 0 to 0.5 minutes, 1 second to 5 minutes, 1 second to 1 minute, or 1 second to 0.5 minutes.

An example of the method in which the extraction is performed by depressurization includes a method in which the buffer present inside the plant body is extracted through a stoma, a water pore, or a cross-section by reducing a pressure in a container holding the plant body into which the buffer has been injected therein. Depressurization may be performed in a state where the plant body into which the buffer has been injected is immersed in the buffer. When the depressurization in the container is performed in the state where the plant body into which the buffer has been injected is immersed in the buffer, the buffer present inside the plant body is extracted through a stoma, a water pore, or a cross-section to be contained in the buffer in which the plant body is immersed. Depressurization in the container can be performed, for example, by evacuating the air from the container. When the container is a syringe, it can be performed, for example, with one side of the syringe sealed, by moving a plunger from the other side in a direction opposite to the tip of the syringe, or by evacuating the air within the plunger from the other side. Depressurization in the container is not especially limited as long as it is lower than atmospheric pressure and the buffer present inside the plant body can be extracted through a stoma, a water pore, or a cross-section, and may be, for example, −0.01 to −0.1 MPa or −0.01 to −0.05 MPa. Depressurization time is not especially limited, and may be, for example, 0 to 5 minutes, 0 to 1 minutes, 0 to 0.5 minutes, 1 second to 5 minutes, 1 second to 1 minute, or 1 second to 0.5 minutes.

The extracting the buffer present inside the plant body by pressurization or depressurization may include increasing or reducing the pressure in a pressure vessel (such as a pressure tank) using a gas, a liquid, a press, or a combination of any of these. When a gas pressure is used, for example, the pressure can be increased by adding a gas to a pressure vessel holding the plant immersed in a buffer therein, and the pressure can be reduced by evacuating the gas (FIG. 3(a)). When a liquid is used, for example, the pressure can be increased by adding a liquid to a pressure vessel holding the plant immersed in a buffer therein, and the pressure can be reduced by drawing the liquid (FIG. 3(b)). When a press is used, for example, an enclosed space containing the plant immersed in a buffer in a pressure vessel holding the plant immersed in the buffer therein is narrowed with the press, and thus, the pressure can be increased by compressing a gas and/or a liquid, and on the contrary, the pressure can be reduced by expanding the enclosed space, or using a pressure reducing valve (FIG. 3(c)).

As the method in which the extraction is performed using osmotic pressure, for example, the plant body is immersed in a buffer having osmotic pressure higher than osmotic pressure of the buffer having been injected into the plant body through a stoma, a water pore, or a cross-section (the buffer contained in an apoplast). For example, the plant body is immersed in a buffer having a concentration higher than a concentration of the buffer having been injected into the plant body through a stoma, a water pore, or a cross-section. For example, assuming that the buffer injected into the plant body through a stoma, a water pore, or a cross-section is referred to as a first buffer and the buffer used in this step is referred to as a second buffer, when the plant body is immersed in the second buffer having a higher concentration than the first buffer, the buffer present inside the plant body can be extracted. The concentration of the buffer may be, for example, a salt concentration or a sugar concentration.

As the buffer, general buffers such as Tris buffers, phosphate buffers, and citric acid buffers can be used. In the present invention, the buffer is not especially limited, and can be appropriately set by those skilled in the art in consideration of influences on respective protein properties such as a hydration property, stability, and activity that can be caused in the target protein. The concentration of a Tris buffer may be, for example, 10 to 300 mM, and may be 10 to 100 mM. The concentration of a phosphate buffer may be, for example, 10 to 200 mM. The concentration of a citric acid buffer may be, for example, 10 to 200 mM. The pH of the buffer may be, for example, pH 3 to 11, pH 5 to 9, or pH 7 to 9.

A time when the plant body is immersed in the second buffer may be, for example, 1 minute to 120 minutes, 5 minutes to 60 minutes, or 10 minutes to 30 minutes.

The buffer to be used may be the same as or different from the buffer having been injected into the plant body through a stoma, a water pore, or a cross-section. When the buffer present inside the plant body is extracted using osmotic pressure, a buffer different at least in osmotic pressure from the buffer having been injected into the plant body through a stoma, a water pore, or a cross-section is used.

The buffer may contain a salt. As the salt contained in the buffer, general salts such as sodium chloride, magnesium chloride, and sodium phosphate can be used. The type and the concentration of an inorganic salt can be appropriately set by those skilled in the art in consideration of influences on respective protein properties such as a hydration property, stability, and activity that can be caused in the target protein. A salt concentration in the buffer may be, for example, 1 to 3000 mM or 1 to 1000 mM. When the buffer present inside the plant body is extracted through a stoma, a water pore, or a cross-section using osmotic pressure, the salt concentration in the second buffer where the plant body is immersed is preferably a salt concentration higher than a salt concentration in the first buffer having been injected into the plant body through a stoma, a water pore, or a cross-section (buffer contained in an apoplast), and may be, for example, 10 to 3000 mM or 10 to 1000 mM. The salt concentration in the second buffer may be, for example, 1-fold or more, 2-fold or more, 1-fold to 1000-fold, or 2-fold to 100-fold higher than the salt concentration in the first buffer. When the plant body is immersed in the second buffer having a salt concentration higher than the salt concentration in the first buffer having been injected into the plant body, the first buffer containing the target protein is extracted into the second buffer due to osmotic pressure.

The buffer may contain a sugar. As the sugar contained in the buffer, general sugars such as sucrose, trehalose, and maltose can be used. The type and the concentration of a sugar can be appropriately set by those skilled in the art in consideration of influences on respective protein properties such as a hydration property, stability, and activity that can be caused in the target protein. The sugar concentration in the buffer may be, for example, 0.1 to 50%, or 0.1 to 10%. When the buffer present inside the plant body is extracted through a stoma, a water pore, or a cross-section using osmotic pressure, the sugar concentration in the second buffer where the plant body is immersed is preferably a sugar concentration higher than a sugar concentration in the first buffer having been injected into the plant body through a stoma, a water pore, or a cross-section (buffer contained in an apoplast), and may be, for example, 0.1 to 50%, or 0.1 to 10%. The sugar concentration in the second buffer may be, for example, 1-fold or more, 2-fold or more, 1-fold to 1000-fold, or 2-fold to 100-fold higher than the sugar concentration in the first buffer. When the plant body is immersed in the second buffer having a sugar concentration higher than the sugar concentration of the first buffer having been injected into the plant body, the first buffer containing the target protein is extracted into the second buffer due to osmotic pressure.

The buffer may contain an additive. Examples of the additive include a chelating agent such as EDTA, NTA, or DTPA, an antioxidant such as α-mercaptoethanol, ascorbate, sodium metabisulfite, or dithiothreitol, a surfactant such as SDS, CTAB, CHAPS, or Triton X-100, a modifier such as urea or guanidine chloride, an amino acid such as aspartic acid or glutamic acid, an alcohol such as glycerol or isopropanol, an enzymatic protein such as cellulase, protease, or pectinase, and a non-enzymatic protein such as expansin.

The buffer may not contain an additive. When an additive such as a chelating agent is added, a process for removing the additive with a column or the like may need to be performed after extracting the buffer through a stoma, a water pore, or a cross-section in some cases. Since the target protein can be extracted with a buffer not containing an additive, the present invention is advantageous in that there is no need to perform the process for removing an additive.

A temperature at which this step is performed is not especially limited, and may be, for example, 1 to 50° C., 1 to 30° C., 1 to 15° C., or 4 to 50° C. For purposes of preventing denaturation of the target protein, the temperature is preferably 30° C. or less. The temperature may be the same as or different from the temperature employed in the step of injecting a buffer into the plant body through a stoma, a water pore, or a cross-section.

As the method in which the extraction is performed using a centrifugal force, for example, the plant body into which the buffer has been injected therein through a stoma, a water pore, or a cross-section is put in a container to be centrifuged with a centrifuge. Owing to the centrifugal force, the buffer present inside the plant body is released into the container through a stoma, a water pore, or a cross-section. Conditions for the centrifugation are not especially limited, and for example, the centrifugation is performed at 100 rpm to 20,000 rpm for 10 to 30 minutes.

When the buffer containing the target protein is extracted, the target protein can be recovered in a state where it is contained in the buffer. In accordance with use of the target protein, a step of separating and purifying the target protein from the buffer may be further included. The step of purifying the target protein from the buffer can be performed by a method well known to those skilled in the art, and can be performed by methods employing salting-out, ethanol precipitation, ultrafiltration, dialysis, filtration, aqueous two-phase separation, gel filtration chromatography, ion exchange column chromatography, affinity chromatography, high/medium pressure liquid chromatography, reversed phase chromatography, and hydrophobic chromatography, and a combination of any of these.

In the method of the present embodiment, there is no need to grind a plant body, and hence a purification process for removing unwanted plant components contained in an extract obtained by grinding a plant body is not necessary, but for the purpose of further increasing the purity of the target protein, a purification process for removing impurities and the like contained in the buffer extracted through a stoma, a water pore, or a cross-section may be further included.

The method of the present embodiment may include a step of checking presence and/or expression level of the target protein. This step may be performed after extracting the buffer containing the target protein, or may be performed after performing separation purification and the like. A method for checking presence and/or expression level of the target protein can be performed in accordance with a method well known to those skilled in the art, such as Wester blotting, or amino acid sequence analysis.

From the viewpoint of improving the extraction efficiency of the target protein, it is preferable, in the method of the present embodiment, that the step of injecting a buffer into a plant body through a stoma, a water pore, or a cross-section includes injecting the buffer by pressurization or depressurization, and that the step of extracting a buffer present inside the plant body through a stoma, a water pore, or a cross-section includes extracting the buffer by pressurization or depressurization. In this case, for example, the injection of a buffer into the plant body by pressurization or depressurization, and the extraction of a buffer present inside the plant body by pressurization or depressurization may be performed with the plant body immersed in the buffer. For example, the injection of a buffer into the plant body by pressurization, and the extraction of a buffer present inside the plant body by depressurization may be performed with the plant body immersed in the buffer. Besides, assuming that a combination of the step of injecting a buffer into a plant body through a stoma, a water pore, or a cross-section and the step of extracting a buffer present inside the plant body through a stoma, a water pore, or a cross-section is defined as 1 set, the method may include repeatedly performing 2 or more sets of these steps. 3 or more sets, 4 or more sets, or 5 or more sets of these steps may be repeated. When 2 or more sets of these steps are repeated, recovery efficiency of the target protein is further improved. An upper limit of the number of times of repeatedly performing the set is not especially limited, and may be, for example, 100 sets or less, 50 sets or less, or 20 sets or less. It is preferable that the plant body is kept to be immersed in the buffer during the whole repetition of the sets.

From the viewpoint of improving the extraction efficiency of the target protein, it is preferable in the method of the present embodiment that the step of injecting a buffer into a plant body through a stoma, a water pore, or a cross section includes injecting the buffer by pressurization or depressurization, and that the step of extracting a buffer present inside the plant body through a stoma, a water pore, or a cross-section includes extracting the buffer using osmotic pressure.

[Method for Producing Target Protein]

A method for producing a target protein according to one embodiment of the present invention comprises a step of providing a plant body that expresses a target protein in an apoplast, a step of injecting a buffer into the plant body through a stoma, a water pore, or a cross-section of the plant body, and a step of extracting a buffer present inside the plant body through a stoma, a water pore, or a cross-section.

A method for providing a plant body in the step of providing a plant body that expresses the target protein in an apoplast can be performed by the method described above regarding the method for recovering a target protein.

To specific aspects and the like of the method of the present embodiment including a step of injecting a buffer into the plant body through a stoma, a water pore, or a cross-section of the leaf of the plant body, and a step of extracting a buffer present inside the plant body through a stoma, a water pore, or a cross-section, the specific aspects and the like described above regarding the method for recovering a target protein can be applied with no limit.

EXAMPLES

Example 1 Production of Plant Body Expressing Target Protein in Apoplast

Gene of phosphodiesterase (target protein) was cloned into a tobacco mosaic virus (TMV) vector (manufactured by Icon Genetics) to be introduced into *Agrobacterium* for transformation, and the resultant was cultured, then, a mixture of a culture fluid was infiltrated into a leaf of *Nicotiana benthamian*, and an infected leaf was collected in about 1 week.

Example 2 Extraction and Recovery of Target Protein

The target protein was extracted and recovered by the following three methods. It is noted that $MgCl_2$ of a buffer component used in each extraction was added because this is essential for stabilizing the target enzyme in this example.

Injection and Extraction of Buffer by Pressurization/Depressurization

The infected leaf collected as above was immersed in a buffer in a 5-fold amount in a weight ratio to which 2 mM $MgCl_2$ was added (50 mM Tris), and the resultant was held in a sealed pressure syringe, a pressure was increased (<0.1 MPa) for several seconds with a piston, then the pressure was restored to normal pressure, was reduced (>−0.1 MPa) for several seconds, and was restored to normal pressure. This pressurization/depressurization process was repeated by 5 sets, and the resultant buffer was recovered. Hereinafter, the thus recovered buffer is referred to also as the pressurization/depressurization extract.

Injection of Buffer by Depressurization, and Extraction by Immersion in High Osmotic Pressure Buffer The collected infected leaf was immersed in a buffer in which 2 mM $MgCl_2$ was added (50 mM Tris), the resultant was set in a pressure desiccator, and the pressure was reduced (to 0.1 MPa) with a vacuum pump, and restored to normal pressure. The resultant infected leaf was recovered, a droplet was wiped off, the resultant was immersed in a high salt concentration buffer (20 mM PB, pH 7.4, 0.5 M NaCl, 5 mM $MgCl_2$) in a 5-fold amount in a weight ratio at normal temperature for 10 to 30 minutes, and the resultant buffer was recovered. Hereinafter, the thus recovered buffer is referred to also as the osmotic pressure extract.

Extraction by Physical Destruction

The collected infected leaf was frozen in liquid nitrogen, the resultant was ground with a motor and pestle, a buffer to which 2 mM $MgCl_2$ was added (50 mM Tris) in a 4-fold amount in a weight ratio was added thereto for suspension at room temperature for 10 minutes, and the resultant was centrifuged (4° C., 10 minutes, 12,000×g) to recover a supernatant. Hereinafter, the thus recovered supernatant is referred to also as the ground extract.

Example 3 Analysis of Respective Extracts

The respective extracts recovered in Example 2 were analyzed by SDS-PAGE, Western blotting, measurement of a total protein content, measurement of a phosphodiesterase content, and measurement of phosphodiesterase activity.

SDS-PAGE and Wester Blotting Analysis

Each sample was treated with a non-reducing denatured sample loading buffer to separate the protein by SDS-PAGE. The resultant gel was stained with CBB staining solution (manufactured by Bio-Rad Laboratories, Inc.). The gel was subjected to Western blotting analysis with HRP-labeled anti-phosphodiesterase rabbit polyclonal antibody to specify a phosphodiesterase band.

Measurement of Total Protein Content

A total protein content was measured by TCA-BCA method using bovine serum albumin as a reference standard (MicroBCA Protein Assay Kit, manufactured by Thermo Fisher Scientific K.K.).

Measurement of Phosphodiesterase Activity

Phosphodiesterase activity was measured with Sphingomyelinase Assay Kit (manufactured by Abcam plc.).

Measurement of Phosphodiesterase Content (ELISA)

A 96-well microplate was coated with an anti-phosphodiesterase rabbit polyclonal antibody at 5° C. for 15 to 18 hours. The resultant plate was washed three times with PBST (0.01 M PBS (phosphate buffer saline) containing 0.1% Tween-20 (pH 7.4)), and was blocked with 2% bovine serum albumin in PBST at 25° C. for 1 hour. Purified phosphodiesterase used as a preparation was diluted with PBST, and each sample was diluted with PBST. After washing the plate with PBST three times, the preparation and the sample were added thereto, and the resultant was incubated at 25° C. for 2 hours. The resultant was washed with PBST three times, an HRP-labeled anti-phosphodiesterase rabbit polyclonal antibody was added thereto, and the resultant was incubated at 25° C. for 1 hour. The resultant was washed with PBST three times, a chromogenic substrate (1-StepML tra TMB-ELISA, manufactured by Thermo Fisher Scientific K.K.) was added thereto, the resultant was incubated at 25° C. for 20 minutes, and 0.313 M sulfuric acid was added thereto to stop the reaction. A plate reader (EnSpire, manufactured by Perkin Elmer Co., Ltd.) was used to measure an absorbance at a wavelength of 450 nm.

Example 4 Comparison (1) of Extraction Effect

The extract obtained by general physical grinding (ground extract of Example 2) and the extract obtained with a pressurization/depressurization (pressurization/depressurization extract of Example 2) were compared in extracted components.

Figure 1:
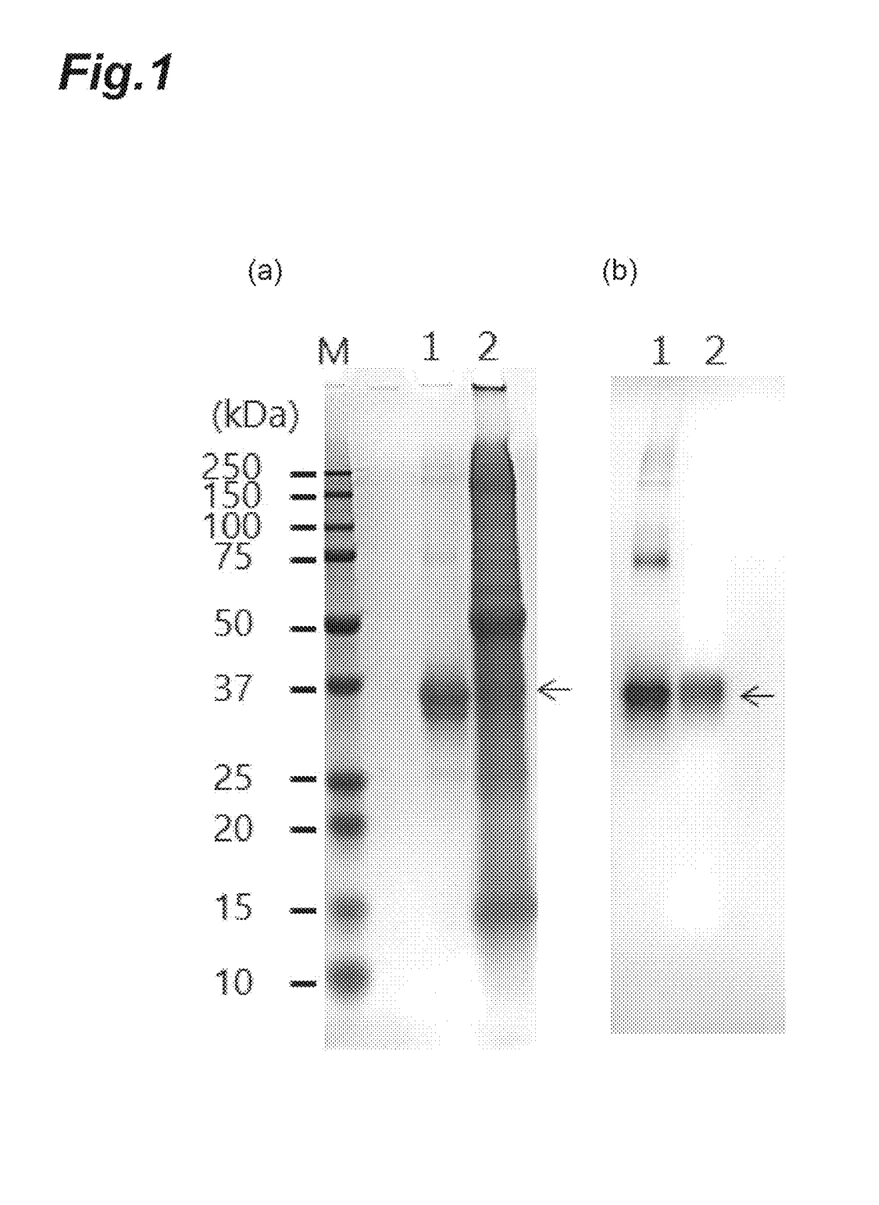
FIG. 1 illustrates results of SDS-PAGE (a) and Western blotting analysis (b) of a ground extract and a pressurization/depressurization extract. Lane 1 corresponds to the result of the pressurization/depressurization extract, lane 2 corresponds to the result of the ground extract, and an arrow corresponds to the position of a phosphodiesterase band.

Results of SDS-PAGE and Wester blotting analysis of the ground extract and the pressurization/depressurization extract are illustrated in FIG. 1. As compared with the ground extract (lane 2 of FIG. 1), phosphodiesterase was extracted in an equivalent or larger amount in the pressurization/depressurization extract (lane 1 of FIG. 1). Besides, in the pressurization/depressurization extract, no plant-derived component was detected in addition to phosphodiesterase.

Regarding each result of the measurement of a total protein content, the measurement of a phosphodiesterase content, and the measurement of phosphodiesterase activity, Table 1 shows an extracted amount, per infected leaf, obtained by pressurization/depressurization, which was calculated assuming that an extracted amount obtained by the physical grinding was 100%.

TABLE 1

| | Physically Ground Extraction | Extraction by pressurization/depressurization |
|---|---|---|
| Total Protein Amount | 100% | 17% |
| Phosphodiesterase Amount | 100% | 219% |
| Phosphodiesterase Activity Amount | 100% | 195% |

As compared with that in the ground extract, the extracted amount of the total protein in the pressurization/depressurization extract was decreased to ⅛, but the extracted amount of phosphodiesterase was increased twofold or more. It was thus revealed that the extraction by pressurization/depressurization is a method capable of highly efficiently extracting an expressed protein with extraction of unwanted plant components greatly suppressed.

Example 5 Comparison (2) of Extraction Effect

The extract obtained by general physical grinding (ground extract of Example 2) and the extract obtained by immersion in a high osmotic pressure buffer (osmotic pressure extract of Example 2) were compared in extracted components.

Figure 2:
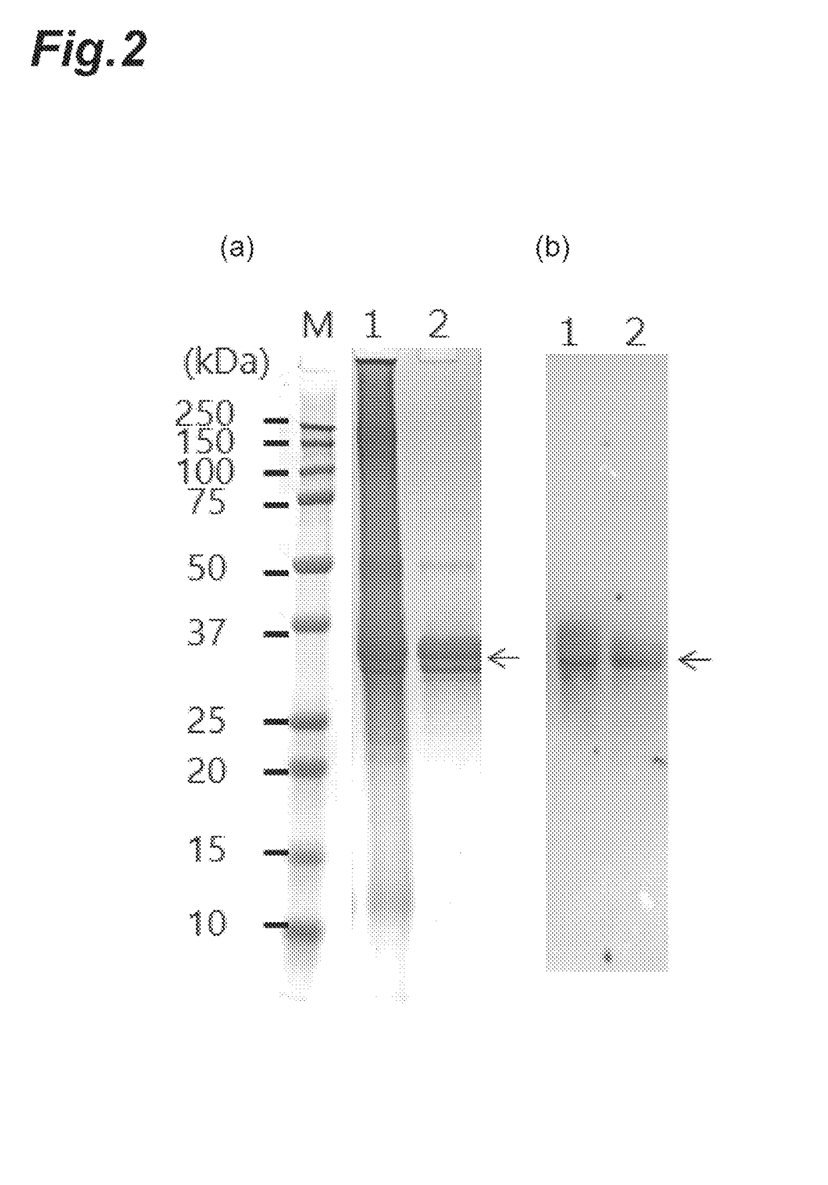
FIG. 2 illustrates results of SDS-PAGE (a) and Wester blotting analysis (b) of a ground extract and an osmotic pressure extract. Lane 1 corresponds to the result of the ground extract, lane 2 corresponds to the result of the osmotic pressure extract, and an arrow corresponds to the position of a phosphodiesterase band.

Results of SDS-PAGE and Wester blotting analysis of the ground extract and the osmotic pressure extract are illustrated in FIG. 2. As compared with the ground extract (lane 1 of FIG. 2), phosphodiesterase was extracted in an equivalent amount in the osmotic pressure extract (lane 2 of FIG. 2). Besides, in the osmotic pressure extract, no plant-derived component was detected in addition to phosphodiesterase.

Regarding each result of the measurement of a total protein content, the measurement of a phosphodiesterase content, and the measurement of phosphodiesterase activity, Table 2 shows an extracted amount, per infected leaf, obtained by immersion in a high osmotic pressure buffer, which was calculated assuming that an extracted amount obtained by the physical grinding was 100%.

TABLE 2

| | Physically Ground Extraction | Extraction by Immersion in High Osmotic Pressure Buffer |
|---|---|---|
| Total Protein Amount | 100% | 19% |
| Phosphodiesterase Amount | 100% | 96% |
| Phosphodiesterase Activity Amount | 100% | 86% |

As compared with that in the ground extract, the extracted amount of the total protein in the osmotic pressure extract was decreased to ⅛, but the extracted amount of phosphodiesterase was equivalent. It was thus revealed that the extraction by immersion in a high osmotic pressure buffer is a method capable of highly efficiently extracting an expressed protein with extraction of unwanted plant components greatly suppressed.

The invention claimed is:

1. A method for recovering a target protein expressed in an apoplast, comprising:
   a step of injecting a buffer into a plant body that expresses the target protein in an apoplast through a stoma, a water pore, or a cross-section of the plant body; and
   a step of extracting the buffer present inside the plant body through a stoma, a water pore, or a cross-section of the plant body, wherein the step of extracting the buffer present inside the plant body through a stoma, a water pore, or a cross-section of the plant body includes:
   extracting the buffer by pressurization or depressurization, wherein the extracting excludes utilizing a centrifugal force, and/or
   immersing the plant body in a buffer having higher osmotic pressure than the buffer having been injected into the plant body through a stoma, a water pore, or a cross-section.

2. The method according to claim 1, wherein the step of injecting a buffer into a plant body through a stoma, a water pore, or a cross-section includes injecting the buffer by pressurization or depressurization.

3. The method according to claim 2, wherein the injecting the buffer into the plant body by pressurization or depressurization includes increasing or reducing the pressure in a pressure vessel using a gas, a liquid, a press, or a combination thereof.

4. The method according to claim 1,
   wherein the step of injecting a buffer into a plant body through a stoma, a water pore, or a cross-section includes injecting the buffer by pressurization or depressurization,
   the step of extracting a buffer present inside the plant body through a stoma, a water pore, or a cross-section includes extracting the buffer by pressurization or depressurization, and
   assuming that a combination of the step of injecting a buffer into a plant body through a stoma, a water pore, or a cross-section and the step of extracting a buffer present inside the plant body through a stoma, a water pore, or a cross-section is defined as 1 set, the method includes repeatedly performing 2 or more sets of the steps.

5. The method according to claim 1, wherein the step of extracting a buffer present inside the plant body through a stoma, a water pore, or a cross-section includes immersing the plant body in a buffer having a higher salt concentration than the buffer having been injected into the plant body through a stoma, a water pore, or a cross-section.

6. The method according to claim 1, wherein the extracting the buffer present inside the plant body by pressurization or depressurization includes increasing or reducing the pressure in a pressure vessel using a gas, a liquid, a press, or a combination thereof.

7. A method for producing a target protein, comprising
   a step of providing a plant body that expresses the target protein in an apoplast;
   a step of injecting a buffer into the plant body through a stoma, a water pore, or a cross-section of the plant body; and
   a step of extracting the buffer present inside the plant body through a stoma, a water pore, or a cross-section of the plant body, wherein the step of extracting excludes utilizing a centrifugal force, and
   wherein the step of extracting the buffer present inside the plant body through a stoma, a water pore, or a cross-section of the plant body includes:
   extracting the buffer by pressurization or depressurization, and/or
   immersing the plant body in a buffer having higher osmotic pressure than the buffer having been injected into the plant body through a stoma, a water pore, or a cross-section.

8. The method according to claim 7, wherein the step of injecting a buffer into the plant body through a stoma, a water pore, or a cross-section includes injecting the buffer by pressurization or depressurization.

9. The method according to claim 8, wherein the injecting the buffer into the plant body by pressurization or depressurization includes increasing or reducing the pressure in a pressure vessel using a gas, a liquid, a press, or a combination thereof.

10. The method according to claim 7,
wherein the step of injecting a buffer into the plant body through a stoma, a water pore, or a cross-section includes injecting the buffer by pressurization or depressurization,
the step of extracting a buffer present inside the plant body through a stoma, a water pore, or a cross-section includes extracting the buffer by pressurization or depressurization, and
assuming that a combination of the step of injecting a buffer into the plant body through a stoma, a water pore, or a cross-section and the step of extracting a buffer present inside the plant body through a stoma, a water pore, or a cross-section is defined as 1 set, the method includes repeatedly performing 2 or more sets of the steps.

11. The method according to claim 7, wherein the step of extracting a buffer present inside the plant body through a stoma, a water pore, or a cross-section includes immersing the plant body in a buffer having a higher salt concentration than the buffer having been injected into the plant body through a stoma, a water pore, or a cross-section.

12. The method according to claim 7, wherein the extracting the buffer present inside the plant body by pressurization or depressurization includes increasing or reducing the pressure in a pressure vessel using a gas, a liquid, a press, or a combination thereof.

\* \* \* \* \*